(12) United States Patent
Atkinson

(10) Patent No.: US 11,346,115 B2
(45) Date of Patent: May 31, 2022

(54) WEIGHT ROOM LIFTING PLATFORM

(71) Applicant: George Atkinson, Indianapolis, IN (US)

(72) Inventor: George Atkinson, Indianapolis, IN (US)

( * ) Notice: Subject to any disclaimer, the term of this patent is extended or adjusted under 35 U.S.C. 154(b) by 252 days.

(21) Appl. No.: 16/780,318

(22) Filed: Feb. 3, 2020

(65) Prior Publication Data

US 2020/0173178 A1 Jun. 4, 2020

Related U.S. Application Data

(63) Continuation of application No. 15/704,729, filed on Sep. 14, 2017, now Pat. No. 10,550,583, which is a continuation of application No. 14/592,358, filed on Jan. 8, 2015, now Pat. No. 9,765,531.

(60) Provisional application No. 61/924,866, filed on Jan. 8, 2014.

(51) Int. Cl.
| | |
|---|---|
| *B32B 3/10* | (2006.01) |
| *E04F 15/10* | (2006.01) |
| *E04F 15/02* | (2006.01) |
| *B32B 33/00* | (2006.01) |
| *A63B 21/072* | (2006.01) |
| *A63B 21/00* | (2006.01) |
| *A63B 71/00* | (2006.01) |

(52) U.S. Cl.
CPC ............ *E04F 15/107* (2013.01); *B32B 33/00* (2013.01); *E04F 15/02172* (2013.01); *A63B 21/0724* (2013.01); *A63B 21/4037* (2015.10); *A63B 2071/0063* (2013.01); *B32B 2307/414* (2013.01); *B32B 2307/744* (2013.01); *B32B 2317/16* (2013.01); *B32B 2471/00* (2013.01); *Y10T 428/24884* (2015.01)

(58) Field of Classification Search
None
See application file for complete search history.

(56) References Cited

U.S. PATENT DOCUMENTS

| | | | |
|---|---|---|---|
| 5,682,724 A | 11/1997 | Randjelovic | |
| 5,780,147 A | 7/1998 | Sugahara et al. | |
| 5,876,825 A | 3/1999 | Daley | |
| 5,992,106 A | 11/1999 | Carling | |
| 6,007,892 A | 12/1999 | Harwood et al. | |
| 6,319,592 B1 * | 11/2001 | Ney | A47G 27/0206 428/142 |
| 6,689,239 B1 | 2/2004 | Grubic | |
| 6,871,363 B2 | 3/2005 | Sabados | |
| 7,033,666 B2 | 4/2006 | Skaja | |

(Continued)

FOREIGN PATENT DOCUMENTS

WO WO 2011/141850 A2 11/2011

OTHER PUBLICATIONS

Lift Platform, http://board.crossfit.com.

*Primary Examiner* — Christopher M Polley
(74) *Attorney, Agent, or Firm* — Woodard, Emhardt, Henry, Reeves & Wagner, LLP

(57) ABSTRACT

Disclosed is a method of adhering a translucent material on top of a central wooden platform of a weight lifting station to make a unitary structure, where the wooden platform or a design positioned between the wooden platform and the translucent material is visible through the translucent material after the translucent material and the wooden platform are adhered together.

21 Claims, 6 Drawing Sheets

(56) References Cited

U.S. PATENT DOCUMENTS

| | | |
|---|---|---|
| 7,093,395 B2 | 8/2006 | Hinault et al. |
| 7,571,572 B2 | 8/2009 | Moller, Jr. |
| 7,748,177 B2 | 7/2010 | Jenkins |
| 8,082,704 B2 | 12/2011 | Stropplana |
| 2002/0142888 A1 | 10/2002 | Marques |
| 2005/0079330 A1* | 4/2005 | Tanel .................. G09F 19/22 428/204 |
| 2005/0239320 A1* | 10/2005 | Folkema ............. A47G 27/045 439/404 |
| 2006/0073305 A1 | 4/2006 | Kola |
| 2008/0214361 A1 | 9/2008 | Oster |
| 2009/0031662 A1 | 2/2009 | Chen et al. |
| 2009/0061168 A1 | 3/2009 | Kim et al. |
| 2009/0145066 A1 | 6/2009 | Pervan et al. |
| 2009/0148666 A1 | 6/2009 | Yeh |
| 2009/0155612 A1 | 6/2009 | Pervan et al. |
| 2009/0220730 A1 | 9/2009 | Price |
| 2010/0092731 A1 | 4/2010 | Pervan et al. |
| 2010/0260963 A1 | 10/2010 | Feng Shen |
| 2010/0300030 A1 | 12/2010 | Pervan et al. |
| 2010/0319282 A1 | 12/2010 | Ruland |
| 2011/0052877 A1 | 3/2011 | Yeh |
| 2011/0056158 A1 | 3/2011 | Moller, Jr. |
| 2011/0268937 A1 | 11/2011 | Schacht et al. |
| 2011/0283642 A1 | 11/2011 | Meirlaen et al. |
| 2011/0296780 A1 | 12/2011 | Windmoller |
| 2012/0276348 A1 | 11/2012 | Clausi et al. |
| 2013/0004751 A1 | 1/2013 | Huang et al. |
| 2013/0014891 A1 | 1/2013 | Vandevoorde et al. |
| 2013/0017372 A1 | 1/2013 | Mechling et al. |
| 2013/0062006 A1 | 3/2013 | Meersseman et al. |
| 2013/0067842 A1 | 3/2013 | Meersseman et al. |
| 2013/0104485 A1 | 5/2013 | Meersseman et al. |
| 2013/0180195 A1 | 7/2013 | Moller, Jr. |
| 2014/0057767 A1 | 2/2014 | Henniger et al. |
| 2014/0178694 A1 | 6/2014 | Reenberg et al. |
| 2014/0227484 A1 | 8/2014 | Sung et al. |
| 2014/0377515 A1 | 12/2014 | Kim |
| 2015/0082730 A1 | 3/2015 | Atkinson |

* cited by examiner

WEIGHT ROOM LIFTING PLATFORM

CROSS-REFERENCE TO RELATED APPLICATIONS

This application is a continuation of U.S. patent application Ser. No. 15/704,729 filed Sep. 14, 2017, issued as U.S. Pat. No. 10,550,583; which is a continuation of U.S. patent application Ser. No. 14/592,358 filed Jan. 8, 2015, issued as U.S. Pat. No. 9,765,531; which claims the benefit of U.S. Provisional Application No. 61/924,866, filed Jan. 8, 2014, which are hereby incorporated by reference.

BACKGROUND

This disclosure is in the field of flooring systems for weight rooms.

Weight rooms may include "power clean" rack locations configured to lift a barbell with weights into the air. After being lifted, the barbell with weights may be dropped from an elevated height to the floor. Traditionally, power clean rack locations include a reinforced platform placed over the floor to help absorb the energy of the dropped barbell and weights and to protect the underlying floor. Power clean rack locations may also provide visual definition to the area to mark the area used for power cleans. There are also stand alone units that are not necessarily combined with a rack. For example, Olympic Lifting Platforms.

Traditional power clean platforms include a central wooden platform flanked on either side by reinforced drop zones on top of a floor. The central wooden platform provides footing for the user while the reinforced drop zones are arranged to receive the dropped weights and barbell. The platforms can be subject to heavy wear and damage during use due to significant weights being dropped onto the platform from several feet.

DESCRIPTION OF THE ILLUSTRATED EMBODIMENTS

Figure 1:
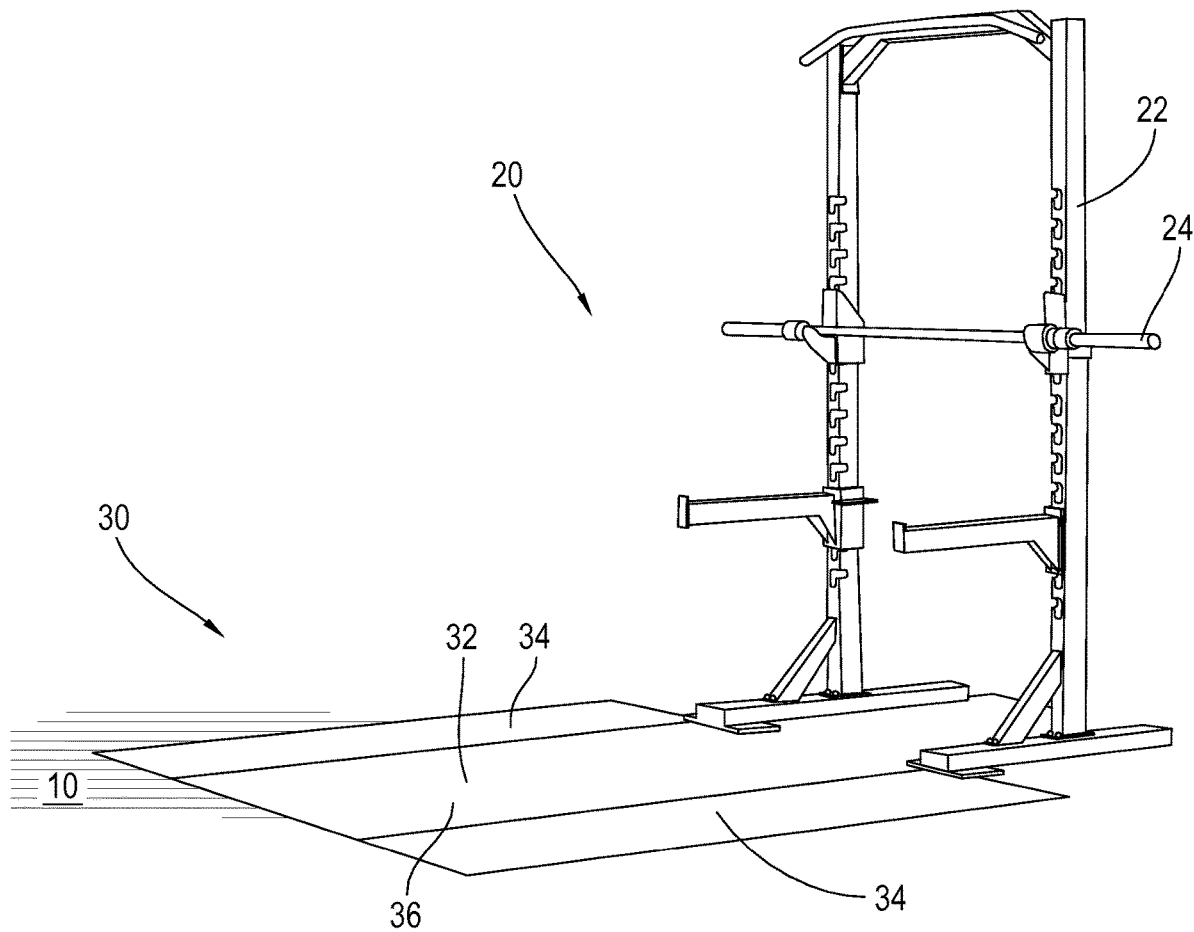
FIG. 1 is a perspective view of a weight lifting station including a weight lifting station floor with a center portion and two drop zones.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

Disclosed is a flooring system for use with a weight lifting station.

Referring to FIG. 1, weight lifting station 20 and weight lifting station floor 30 are illustrated. Weight lifting station 20 includes rack 22 and barbell 24. Barbell 24 may hold a number of weights (not illustrated). Barbell 24 may be used for a variety of weightlifting exercises including, but not limited to, power cleans, clean and jerk, squats and shoulder presses.

Weight lifting station floor 30 includes center portion 32 and drop zones 34 on either side of center portion 32 Weight lifting station floor 30 is configured with the top surface flush with surrounding floor 10. Center portion 32 may optionally include design 36. Examples of design 36 include a colored pattern, an image, a logo, a wood grain or any combination of designs such as a logo surrounded by a wood grain design.

An individual lifting barbell 24 may on occasion drop the barbell from a height onto the floor. Drop zones 34 are constructed and arranged to absorb the energy of the dropped weights without permanent damage. Drop zones 34 may also include some degree of resiliency to protect the dropped weights from damage. For example, in one embodiment, weight lifting station floor 30 may be configured based on a weight of 800 pounds being dropped from a height of 9 feet. In another embodiment, weight lifting station floor 30 may be configured based on a weight of 400 pounds being dropped from a height of 9 feet.

Weight lifting station floor 30 may be configured as part of a larger flooring system where center portion 32 and drop zones 34 are adjacent to and coupled to surrounding flooring, for example, generic weight room flooring tiles, to form an integrated floor that includes weight lifting station floor 30. Center portion 32 and drop zones 34 may optionally include connective features (not illustrated), for example, dowel holes or integrated connecting system, as known in the art, to facilitate assembly with other flooring materials. In such an installation, center portion 32 and drop zones 34 may be the same height as other flooring components to create a flush top flooring surface without height discontinuities between different portions.

Figure 2:
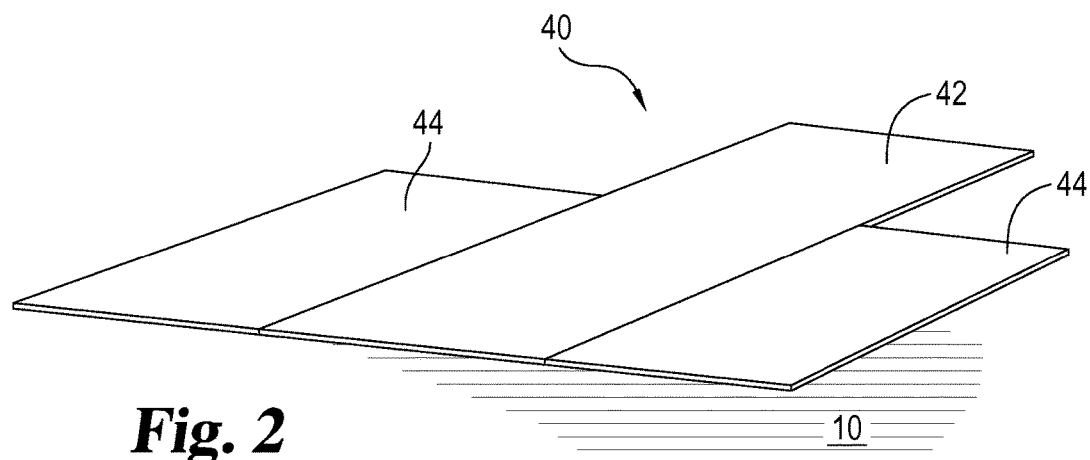
FIG. 2 is a perspective view of a raised platform weight lifting station floor including a center portion and two drop zones.

Referring now to FIG. 2, lifting platform 40 is illustrated. Lifting platform 40 includes platform center 42 and platform drop zones 44 on either side of center portion 42. In the illustrated embodiment, lifting platform 40 is positioned on top of surrounding floor 10 as a platform. In other embodiments, lifting platform 40 may be recessed in a pre-existing floor to minimize any height variation between lifting platform 40 and surround flooring. Drop zones 44 are constructed to absorb the energy of drop weights without permanently damaging drop zone 44. Drop zones 44 may also include some degree of resiliency to protect the dropped weights from damage. Lifting platform 40 may be positioned on top of surrounding floor 10. Lifting platform 40 may alternatively be installed in a cut out portion of flooring creating a flush or substantially flush flooring with lifting platform 40 integrated as part of the larger overall floor in a space.

Figure 3:
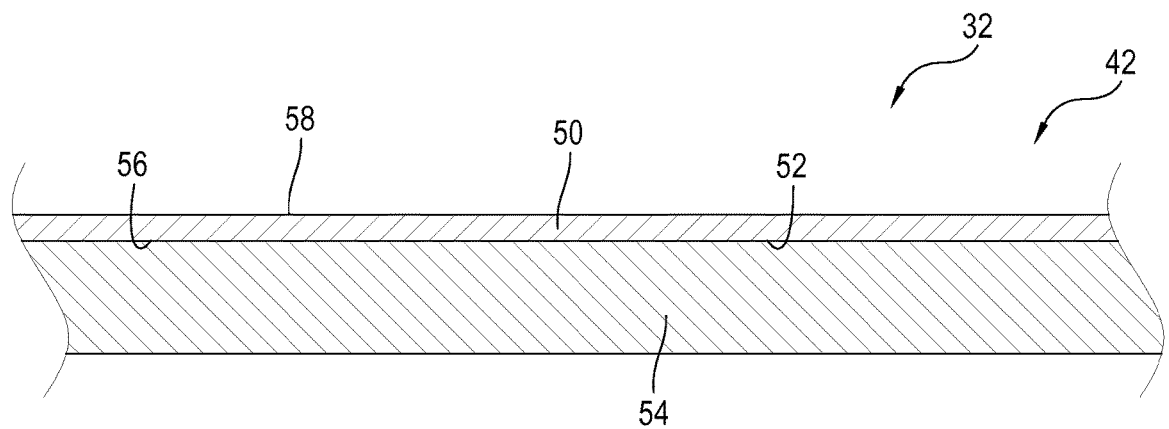
FIG. 3 is a side view of a center portion of a weight lifting station floor.

Referring now to FIG. 3, a side view of a center portion 32 or platform center 42 is illustrated. Center portion 32 includes translucent synthetic floor material 50, display layer 52 and resilient floor material 54. Translucent synthetic floor material 50, display layer 52 and resilient floor material 54 preferably are adhered together to create an integrated unit. In some embodiments, translucent synthetic floor material 50 may be characterized as transparent. Center portion 32 typically has a minimum total thickness of approximately ⅜". In one embodiment, center portion 32 has a total thickness of approximately 1¼". In another embodiment, center portion 32 has a total thickness of approximately 1½". Platform center 42 includes the same construction as center portion 32. Platform center 42 also typically has a minimum total thickness of approximately ⅜". In one embodiment, platform center 42 has a total thickness of approximately 1¼". In another embodiment, platform center 42 has a total thickness of approximately 1½".

Translucent synthetic floor material 50 includes bottom surface 56 and top surface 58. Bottom surface 56 may be substantially smooth. Top surface 58 may include a non-smooth texture constructed and arranged as a non-slip finish. Top surface 58 may alternatively include a substantially smooth surface. In one embodiment, translucent synthetic floor material 50 is a sheet of clear polyvinyl chloride (PVC). Typically, translucent synthetic floor material 50 has a minimum thickness of 1/16". In one embodiment, translucent synthetic floor material 50 has a thickness of approximately ⅛". For a standard sized weight lifting station, translucent synthetic floor material 50 preferably is a unitary and continuous sheet that has no seams or discontinuities. This may reduce trip hazards and improve the footing for an individual using weight lifting station 20. This may also improve the visual appearance of flooring and reduce visual distortion of design 36. In one embodiment, translucent synthetic floor material 50 has a width of approximately 42 inches and a length of approximately 60 inches.

As used herein, translucent mean that the translucent synthetic floor material permits the passage of light, allowing display layer 52 to be viewed through the translucent synthetic floor material. Translucent floor material is intended to encompass both transparent materials that permit clear viewing of display layer 52 through the translucent synthetic floor material and materials that diffuse the transmission of light such that display layer 52 may not be clearly seen through the translucent synthetic floor material.

Translucent synthetic floor material 50 should also include some degree of impact-resistance to avoid fracturing if weights are accidently dropped on it. Sheet PVC with a ⅛" thickness (on top of a thicker resilient material) has been found to perform under the described conditions.

Display layer 52 may include printing on bottom surface 56 that is oriented toward translucent synthetic floor material 50 and is visible through translucent synthetic floor material 50. Printing may be applied to bottom surface 56 with a wide format printer. Alternatively, display layer 52 may include a printed sheet oriented so that the printing is visible through translucent synthetic floor material 50. Such a printed sheet may be translucent. In either case, display layer 52 may include a colored pattern, an image, a logo and/or a design. A wood grain design that simulates the appearance of a wooden platform may be used with a logo.

Resilient floor material 54 may comprise a synthetic rubber such as styrene-butadiene rubber (SBR) to provide the toughness, resiliency and thickness needed for this application. Alternatively, other resilient materials such as PVC may be used as resilient floor material 54. In yet other embodiments, natural resilient materials such as wood may be used as resilient floor material for center portions 32 or platform centers 42. Typically, resilient floor material 54 has a minimum thickness of approximately ¼". In one embodiment, resilient floor material 54 has a thickness of approximately 1⅛". In another embodiment, resilient floor material 54 has a thickness of approximately 1⅜".

Figure 4:
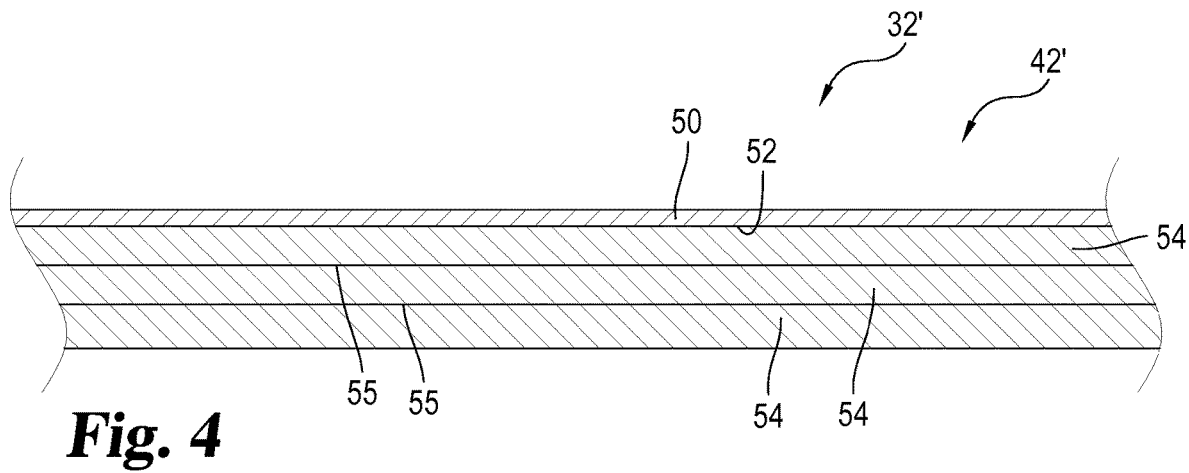
FIG. 4 is a side view of an alternative embodiment of the center portion of a weight lifting station floor.

Referring now to FIG. 4, a side view of an alternative embodiment of the center portion 32 or platform center 42 is illustrated as center portion 32' and platform center 42'. The description of center portion 32' below also applies to platform center 42'. Center portion 32' includes three layers of resilient floor material 54 adhered together with adhesive layers 55. SBR is available in sheets of various thicknesses. By layering multiple layers of resilient floor material 54 together, as illustrated, various total thicknesses can be obtained using standard product thicknesses.

Figure 5:
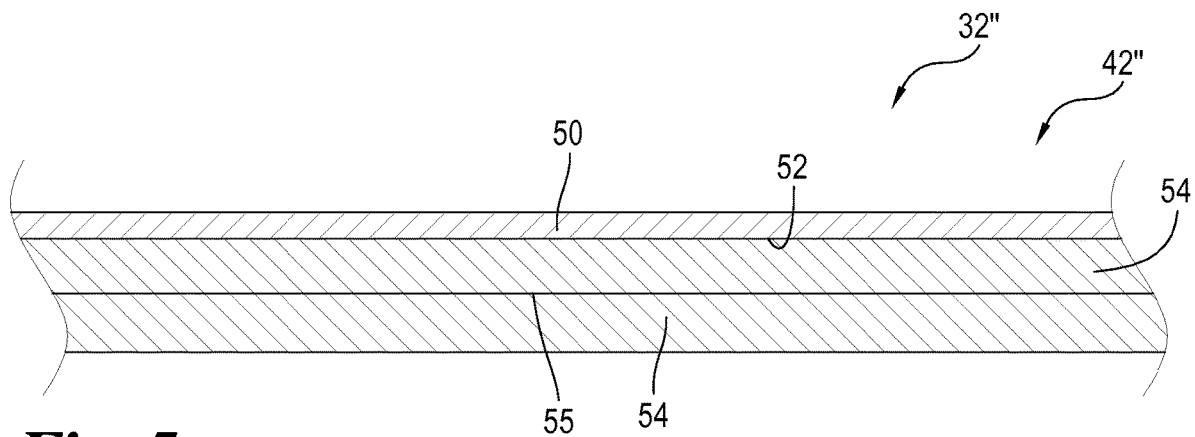
FIG. 5 is a side view of another alternative embodiment of the center portion of a weight lifting station floor.

Referring now to FIG. 5, a side view of another alternative embodiment of the center portion 32 or platform center 42 is illustrated as center portion 32" and platform center 42". Center portion 32" and platform center 42" include two layers of resilient floor material 54 adhered together with adhesive layer 55.

Figure 6:
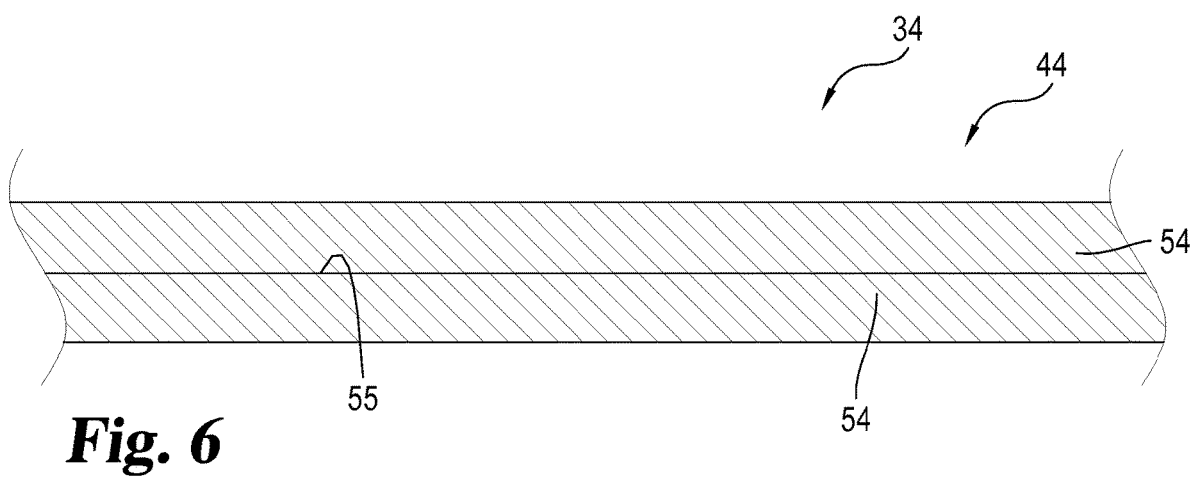
FIG. 6 is a side view of a drop zone.

Referring now to FIG. 6, a side view of drop zone 34 or drop zone 44 is illustrated. In the illustrated embodiment, drop zone 34 and drop zone 44 include two layers of resilient floor material 54 adhered together with adhesive layer 55. Other embodiments may utilize any number of layers of resilient floor material 54 desired, including, but not limited to one layer, three layers or four or more layers.

Figure 7:
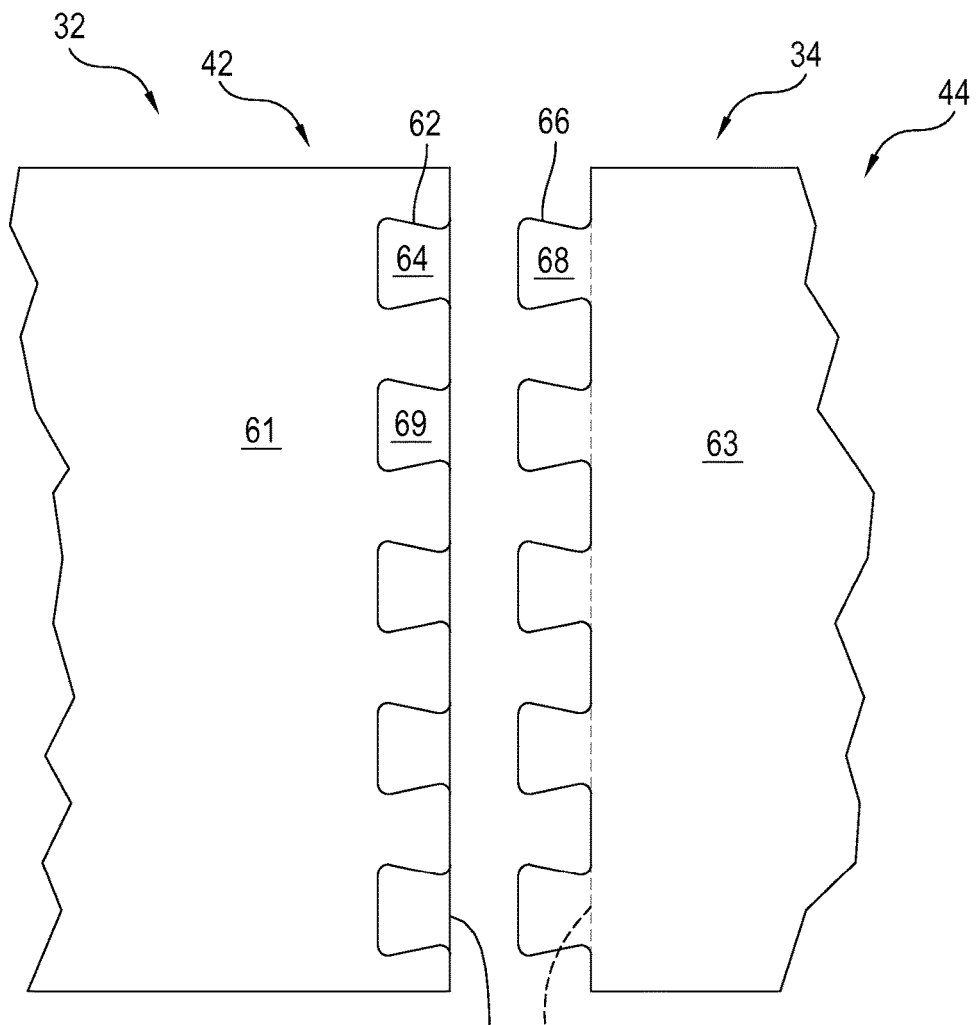
FIG. 7 is a bottom plan view of an embodiment of a center portion and a drop zone showing an interlocking geometry arrangement.
Figure 8:
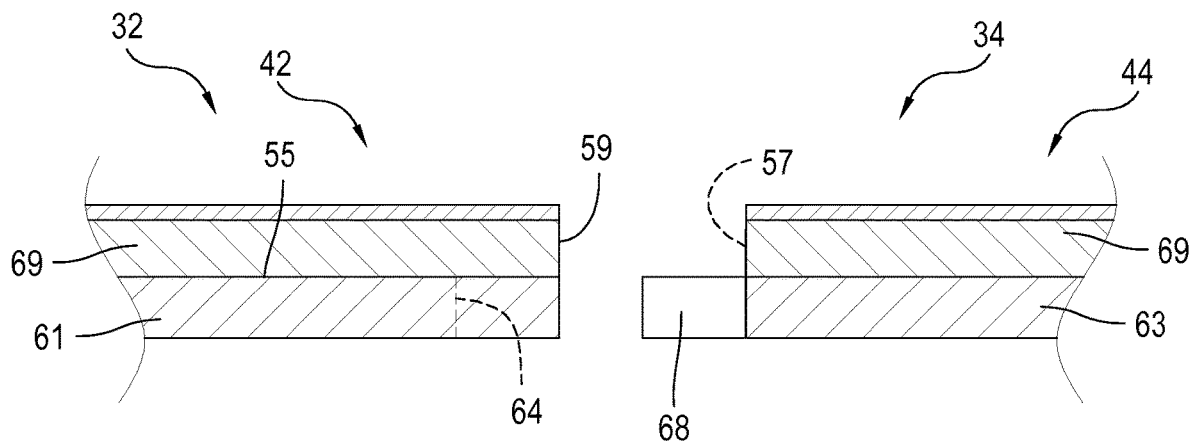
FIG. 8 is a side elevation view of the center portion and the drop zone shown in
FIG. 7.

Referring now to FIGS. 7 and 8, a bottom plan view and a side elevation view of an embodiment of center portion 32 or platform center 42 and drop zones 34 or 44 are illustrated. In the illustrated embodiment, center portion 32 or platform center 42 includes resilient floor portion 69 and resilient floor portion 61. Resilient floor portion 69 includes straight edge 59. Resilient floor portion 61 includes profiled edge 62 that defines a plurality of recesses 64.

In the illustrated embodiment, drop zones 34 or 44 include one upper portion of resilient floor 69 and one lower portion of resilient floor material 63. Resilient floor portion 69 includes straight edge 57. Resilient floor lower portion 63 includes profiled edge 66 that defines a plurality of tabs 68. Tabs 68 are constructed and arranged to interlock in recesses 64 defining an interlocking geometry. Straight edge 59 is constructed and arranged to abut straight edge 57 to form a flush top surface with a straight seam when drop zones 34 or

44 are attached center portion 32 or platform center 42 by tabs 68 interlocking in recesses 64.

Profiled edge 62 defines a first interlocking geometry complementary with and constructed and arranged to interlock with a second interlocking geometry defined by profiled edge 66. Straight edges 57 and 59 are constructed and arranged to define a substantially straight transition on the top of weight lifting station floor 30 or lifting platform 40 between drop zones 34 or 44 and center portion 32 or platform center 42.

Profiled edges 62 and 66 may be created by cutting a commercially available sheet of resilient material with a cutting die or a water jet to form the desired shape. Alternatively, resilient floor portion 61 and 63 may be formed by molding a synthetic rubber such as SBR directly into the desired shape. Resilient floor portion 61 and 63 may comprise the same material used as resilient floor portion 69 or may comprise a different material. Resilient floor portions 61 and 63 may be integrally molded with resilient floor portions 69 or resilient floor portions 61 and 63 may comprise separate layers of resilient material as resilient floor portions 69.

Other embodiments can use different structures to connect drop zones 34 or 44 to center portion 32 or platform center 42. For example, dowel holes or integrated connecting system, as known in the art, can be incorporated into drop zones 34 or 44 and center portion 32 or platform center 42. In addition, weight lifting station floor 30 or lifting platform 40 may be adhered directly to a underlying floor material to maintain the relative position of all the components.

Figure 9:
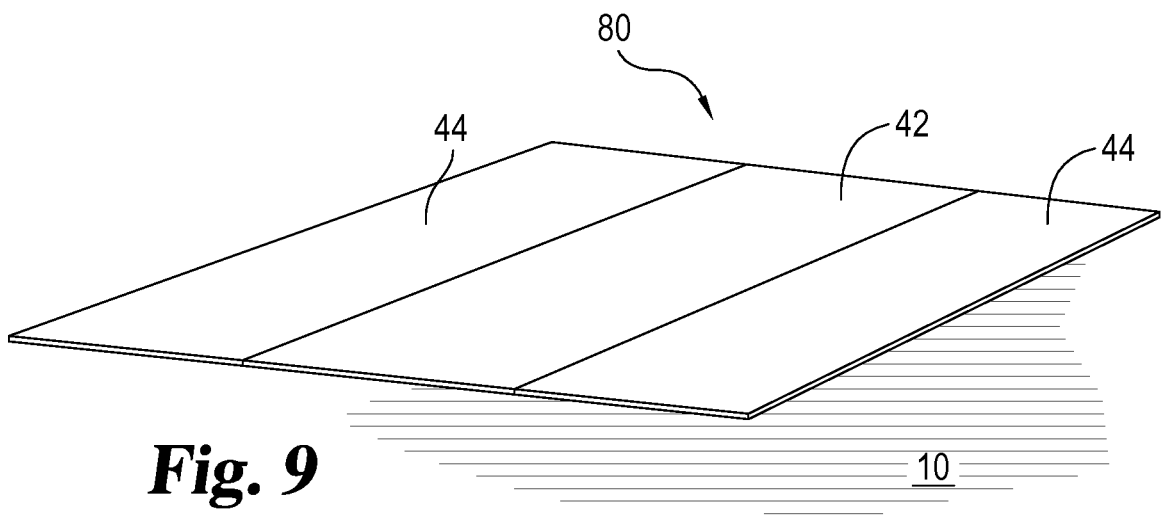
FIG. 9 is a perspective view of an alternative embodiment of a raised platform weight lifting station floor including a center portion and two drop zones.

Referring now to FIG. 9, lifting platform 80 is illustrated. Lifting platform 80 includes platform center 42 and platform drop zones 44 on either side of center portion 42, with drop zones 44 extending the length of platform center 42. In the illustrated embodiment, lifting platform 80 is positioned on top of surrounding floor 10 as a platform. In other embodiments, lifting platform 80 may be recessed in a pre-existing floor to minimize any height variation between lifting platform 80 and surround flooring. Lifting platform 80 may alternatively be installed in a cut out portion of flooring creating a flush or substantially flush flooring with lifting platform 80 integrated as part of the larger overall floor in a space. Platform center 42 and platform drop zones 44 otherwise may include the same features describe above with regard to other embodiments.

Weight lifting station floor 30 or lifting platform 40 may be provided as a kit for retrofitting preexisting spaces or weight lifting station floor 30 or lifting platform 40 may be integrated as part of a new floor installation that includes additional flooring. The overall thickness of weight lifting station floor 30 or lifting platform 40 may be selected to match existing flooring.

Note that while adhesives are discussed above as useful for joining layers of flooring together, other fastening methods can also be used with the disclosed flooring, including, but not limited to external mechanical fasteners and integrated mechanical interlocking features. In one embodiment, a pressure sensitive adhesive is used to join layers of flooring together.

In another embodiment, a similar translucent floor material may be used to refurbish traditional wooden central platforms of existing weight lifting stations. Many weight lifting platforms utilize a wooden central platform that may include a design, as the central portion of a lifting location where the lifter stands. Over time and with repeated use, such wooden platforms may become worn and/or covered with material such as shoe scuffs. To refurbish such units, a translucent floor material may be adhered over the existing wooden platform to provide a more durable and easily cleaned surface for the lifters to stand upon. This is described below and in FIGS. 10-12.

Figure 10:
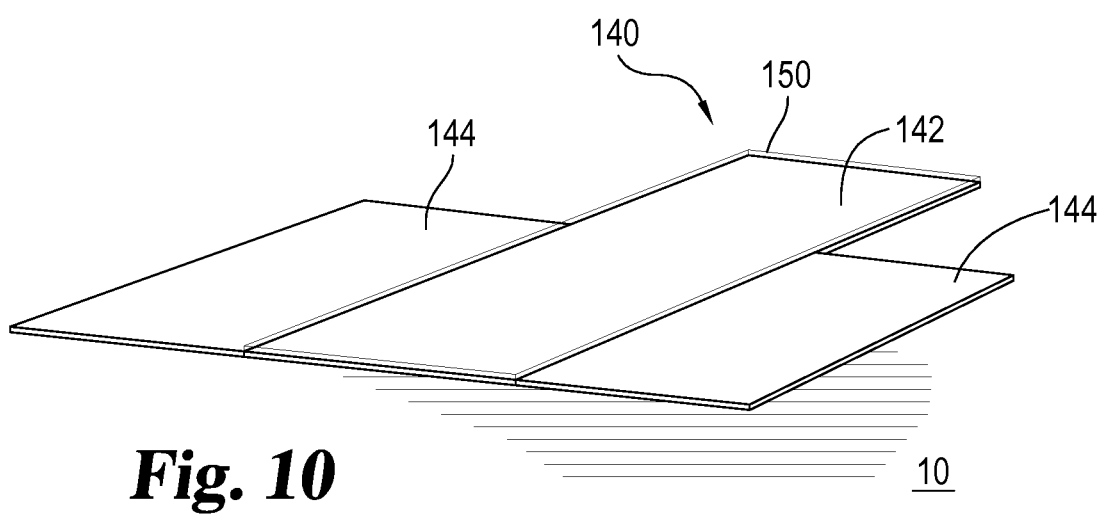
FIG. 10 is a perspective view of a raised wooden platform weight lifting station flooring including a central wooden platform and two drop zones.
Figure 11:
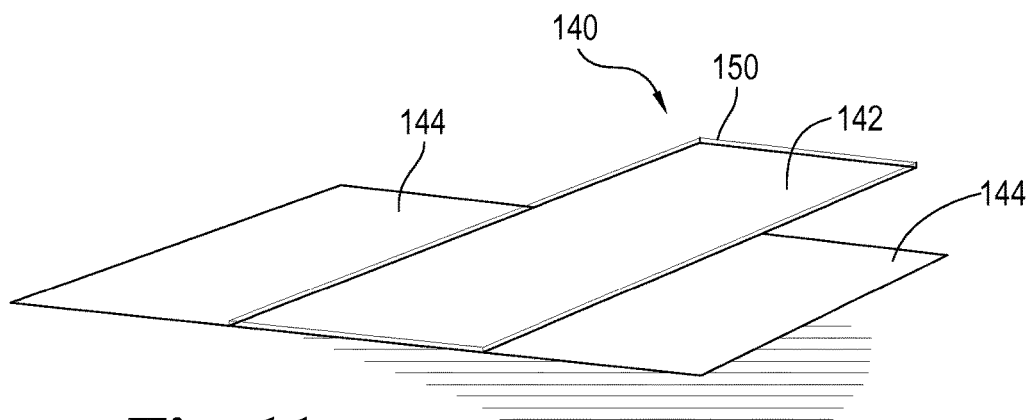
FIG. 11 is a perspective view of a recessed wooden platform weight lifting station flooring including a central wooden platform and two drop zones.

Referring now to FIGS. 10 and 11, lifting platform 140 is illustrated. Lifting platform 140 includes platform center 142 and platform drop zones 144 on either side of center portion 142. In the embodiment illustrated in FIG. 10, lifting platform 140 is positioned on top of surrounding floor 10 as a platform. As shown in FIG. 11, lifting platform 140 may be recessed in floor 10 to minimize any height variation between lifting platform 140 and surround flooring. Drop zones 144 are constructed to absorb the energy of drop weights without permanently damaging drop zone 144. Drop zones 144 may also include some degree of resiliency to protect the dropped weights from damage. Lifting platform 140 may be installed in a cut out portion of flooring creating a flush or substantially flush flooring with lifting platform 140 integrated as part of the larger overall floor in a space.

Figure 12:
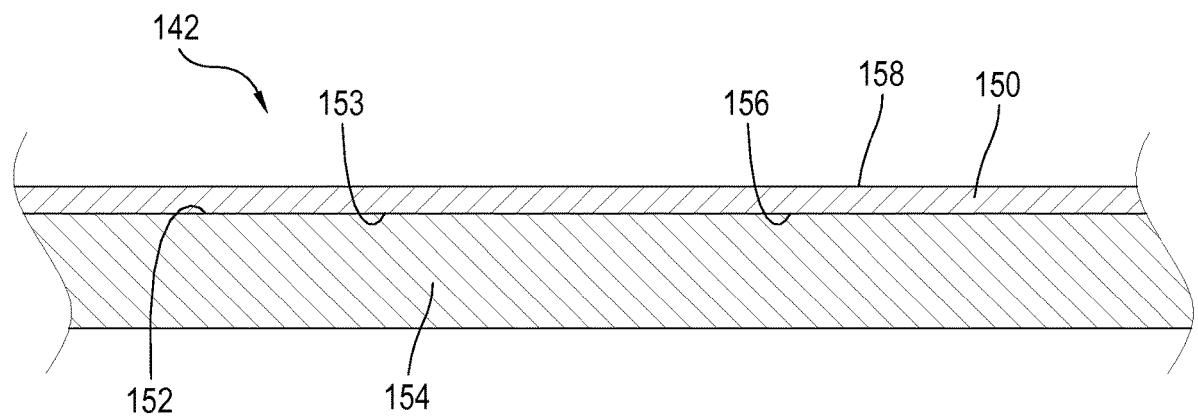
FIG. 12 is a side view of the central wooden platform of FIGS. 10 and 11.

Referring now to FIG. 12, a side view of a center portion 142 is illustrated. Center portion 142 includes translucent synthetic floor material 150, top layer 152 and wooden floor 154. Center portion 142 may also optionally include display layer 153. Translucent synthetic floor material 150, top layer 152, display layer 153 and wooden floor 154 preferably are adhered together to create an integrated unit. In some embodiments, translucent synthetic floor material 150 may be characterized as transparent.

In both FIGS. 10 and 11, translucent synthetic floor material 150 is applied over the top of a previously installed wooden floor 154. Therefore, translucent synthetic floor material 150 may be positioned above adjacent flooring structures such as drop zones 144.

Translucent synthetic floor material 150 includes bottom surface 156 and top surface 158. Bottom surface 156 may be substantially smooth. Top surface 158 may include a non-smooth texture constructed and arranged as a non-slip finish. Top surface 158 may alternatively include a substantially smooth surface. In one embodiment, translucent synthetic floor material 150 is a sheet of clear polyvinyl chloride (PVC). Typically, translucent synthetic floor material 150 has a minimum thickness of $\frac{1}{16}$". In one embodiment, translucent synthetic floor material 150 has a thickness of approximately $\frac{1}{8}$". For a standard sized weight lifting station, translucent synthetic floor material 150 preferably is a unitary and continuous sheet that has no seams or discontinuities. This may reduce trip hazards and improve the footing for an individual using weight lifting station 20. This may also improve the visual appearance of flooring and reduce visual distortion of a design on top surface 152 of wooden floor 154. In one embodiment, translucent synthetic floor material 150 has a width of approximately 42 inches and a length of approximately 60 inches.

Display layer 153, if used, may include printing on bottom surface 156 that is oriented toward translucent synthetic floor material 150. Printing may be applied to bottom surface 156 with a wide format printer. Alternatively, display layer 153 may include a printed sheet oriented so that the printing is visible through translucent synthetic floor material 150. Such a printed sheet may optionally also be translucent. In either case, display layer 153 may include a colored pattern, an image, a logo and/or a design. A wood grain design that simulates the appearance of a wooden platform may be used with a logo.

Before adhering translucent synthetic floor material 150 to wooden flooring 154, wooden flooring 154 may first be cleaned and/or prepared. This may include cleaning with a chemical cleaner, rubbing, polishing and/or use of an abrasive to prepare the surface. Preparation may also include repairing or replacing any design(s) on top surface 152.

Also note, while the above system is described as a way to refurbish worn wooden platforms, the translucent floor material may also be used with new wooden platforms as part of an original installation. In such an application, the translucent floor material may optionally be installed substantially smooth with adjacent flooring and/or drop zones to minimize any surface discontinued created by the translucent floor material. Alternatively, the above system can be used to obscure the appearance of the original flooring, such as having display layer 153 cover the entirety of bottom surface 156.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:

1. A weightlifting platform for use with a barbell bearing weights, wherein the weightlifting platform is positioned on an underlying surface, the weightlifting platform comprising:
   a resilient rubber platform;
   a translucent material positioned over said resilient rubber platform; and
   a design positioned between said resilient rubber platform and said translucent material, wherein said design is visible through said translucent material;
   an adhesive between said translucent material and said platform that adheres said translucent material to said platform, wherein said resilient rubber platform and said translucent material are integrated together as a unitary structure;
   wherein the weightlifting platform is at least three eighths of an inch (9.5 mm) thick, wherein the weightlifting platform has a constant thickness across an entire width of the weightlifting platform and wherein right and left sides of the weightlifting platform define first and second vertical straight edges that are adapted to abut adjacent drop zones.

2. The weightlifting platform of claim 1, wherein said translucent material is clear flexible vinyl.

3. The weightlifting platform of claim 1, wherein said translucent material comprises a textured side constructed and arranged as a non-slip finish, wherein said textured side is faced away from said resilient rubber platform.

4. The weightlifting platform of claim 1, wherein said translucent material comprises a smooth side that is faced toward said resilient rubber platform.

5. The weightlifting platform of claim 1, wherein said translucent material has a minimum thickness of approximately one sixteenth of an inch (1.6 mm).

6. The weightlifting platform of claim 1, wherein said translucent material is approximately one eighth of an inch (3.2 mm) thick.

7. The weightlifting platform of claim 1, wherein said translucent material covers an entire top surface of said resilient rubber platform.

8. The weightlifting platform of claim 7, wherein said translucent material comprises a unitary and continuous sheet with no seams or discontinuities across its entire width and length.

9. The weightlifting platform of claim 8, wherein said translucent material has a minimum width, of approximately 42 inches (107 cm) and a minimum length of approximately 48 inches (122 cm).

10. The weightlifting platform of claim 7, wherein said design covers the entire resilient rubber platform.

11. The weightlifting platform of claim 7, wherein a thickness of the weightlifting platform is at least 1.25 inches (32 mm).

12. The weightlifting platform of claim 5, wherein a thickness of the weightlifting platform is t least 1.5 inches (38 mm).

13. The weightlifting platform of claim 1, further comprising drop zones on either side of the platform, wherein the translucent floor material adhered to the resilient rubber platform does not cover the drop zones.

14. The weightlifting platform of claim 13, wherein said drop zones are constructed and arranged to absorb the energy of dropped weights without permanent damage.

15. The weightlifting platform of claim 14, wherein said drop zones are constructed of a resilient material.

16. The weightlifting platform of claim 1, wherein said platform is affixed directly to the underlying floor.

17. The weightlifting platform of claim 1, wherein said platform has a minimum width of approximately 42 inches (107 cm) and a minimum length of approximately 48 inches (122 cm).

18. The weightlifting platform of claim 13, wherein the resilient rubber platform defines a profiled edge adapted to define a first interlocking geometry complementary with a second interlocking geometry defined on the drop zones.

19. The weightlifting platform of claim 17, wherein the resilient rubber platform further defines a first straight edge that overlays the first interlocking geometry adapted to abut a second straight edge defined on the drop zones.

20. The weightlifting platform of claim 1, wherein the weightlifting platform is an Olympic weightlifting platform.

21. The weightlifting platform of claim 1, wherein said design is printed on said translucent material.

* * * * *

UNITED STATES PATENT AND TRADEMARK OFFICE
CERTIFICATE OF CORRECTION

PATENT NO. : 11,346,115 B2
APPLICATION NO. : 16/780318
DATED : May 31, 2022
INVENTOR(S) : George Atkinson It is certified that error appears in the above-identified patent and that said Letters Patent is hereby corrected as shown below:

In the Claims

Column 8, Line 25, replace "t" with --at--.

Signed and Sealed this
Nineteenth Day of July, 2022

*Katherine Kelly Vidal*

Katherine Kelly Vidal
*Director of the United States Patent and Trademark Office*